J. A. HALL.
RAIL.
APPLICATION FILED FEB. 17, 1915.

1,166,363.

Patented Dec. 28, 1915.

WITNESSES:
Frank H. Fowler
Ella Kelly

INVENTOR
James Arthur Hall.
BY
Fred P. Girvin
ATTORNEY

UNITED STATES PATENT OFFICE.

JAMES ARTHUR HALL, OF SEATTLE, WASHINGTON.

RAIL.

1,166,363.  Specification of Letters Patent.  Patented Dec. 28, 1915.

Application filed February 17, 1915. Serial No. 8,911.

*To all whom it may concern:*

Be it known that I, JAMES ARTHUR HALL, a citizen of the United States, and residing at Seattle, in the county of King and State of Washington, have invented certain new and useful Improvements in Rails, of which the following is a specification.

My invention relates to improvements in rails, and has for its principal object: to provide a device of the above generally described character which when secured in pairs in proper spaced relation to each other, is adapted to provide a running track for vehicles of various gages and without flanged wheels, the principal features of which are a flange integral with a traction surface of the rail, a corrugated traction surface and means for securing the rail to the cross ties. My invention is adapted to be used for a track for vehicles which do not have flanged wheels such as automobiles, trucks and the like.

A track formed of my improved rails is much cheaper, as to first cost and maintenance, than a highway and in addition possesses many advantages such as providing a hard and true traction surface which materially reduces the rolling friction below that of the usual highway and at the same time increases the traction between the wheel and traction surface.

Other objects will appear as my invention is more fully described in the following specification, illustrated in the accompanying drawings and pointed out in the appended claims.

Figure 1:
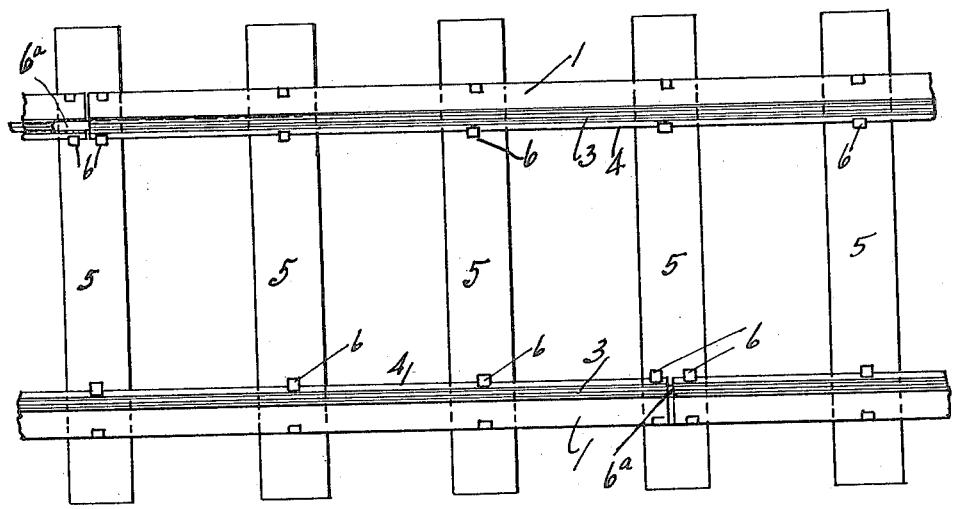
Figure 2:
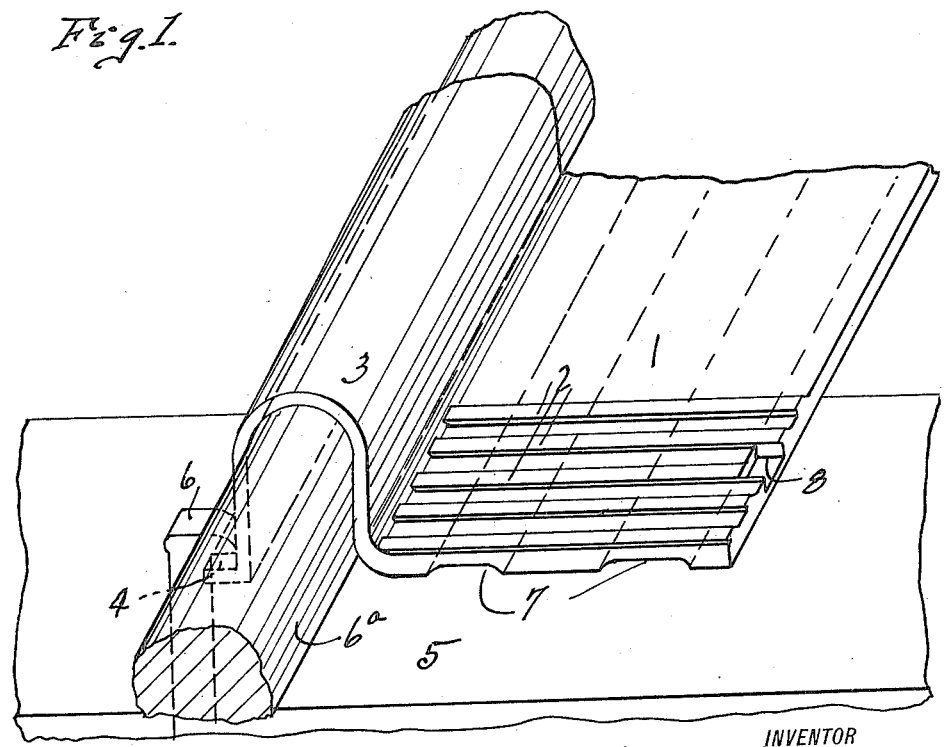

In the drawings, Figure 1 is a plan view of a track formed with my rails. Fig. 2 is a perspective view of a portion of one of my rails.

Referring now more particularly to the drawings, numeral 1 designates the tread portion of a rail which may be provided with deformations or corrugations which in this instance run transversely with the tread portion, but it is obvious that these corrugations may run obliquely to the track portion, and that instead of the corrugations the tread portions could be transversely scored. Integral with the tread portion is an upstanding flange or bead 3 which bends back in the form of a semicircle as shown in Fig. 2 and terminates in a base flange 4 which is adapted to rest upon cross ties 5 and to be secured thereto by spikes 6. The rails are spliced together by a splice bar 6ª which is of such shape as to fit tightly within the hollow bead 3 of the rail and to bear against the ties 5. The splice bar 6ª is long enough to extend over two or more ties to which it is frictionally held by the rail and its holding spikes 6. The function of the splice bar is to hold the rails in straight alinement and to stiffen the joints against deflection. The tread portion is cored as at 7 on the under side for lightness. Recesses 8 are formed in the edges of the tread portion 1 to receive the heads of spikes so that the said heads will not project above the traction surface of the tread portion and thus become a menace to resilient tires of trucks and the like. The tread portions 1 of my units are of sufficient width to form a track, when laid as in Fig. 1, upon which vehicles of varying gages may easily travel without danger of the wheels on either side of the said vehicle running off of said tread portion. It will be understood that the rails may be laid so that the flanges 3 come on either the inside or outside of the tread portion 1 as desired, but I prefer them on the outside as shown.

Many uses and purposes for a rail of this character will readily suggest themselves especially in view of the present development of the motor truck, for example in the construction of feeder lines to a main highway in a rural district where the expense of a highway feeder line would be excessive, my device might be used to advantage in constructing feeder lines for motor trucks, and at the same time be of use for pleasure cars as the latter might easily leave the rails, get out on the ground and pass a truck, and again get on the track, due to their lightness of weight. This form of road would be usable at all times of year and would make possible the construction of feeder lines where otherwise the cost would be prohibitive. It is believed that the proposition of constructing a road as outlined would receive favorable support from State, county and municipalities interested. It is clear that vehicles operating on paved streets or roads wherein my device is laid will produce less wear upon said paved streets and resultant chuck holes because such vehicles would use a track of my design in preference, although the streets be paved as stated. It will be further noted that the maintenance on tires and fuel consumption will be materially decreased with the use of my rails.

I have shown and described a particular form of embodiment of my invention but am aware that many minor changes therein will readily suggest themselves to others skilled in the art without departing from the spirit and scope of the invention, and I therefore desire to avoid being limited to the exact form shown and described.

Having described my invention, what I claim as new and desire to protect by Letters Patent is—

1. In a track for motor driven vehicles using unflanged wheels, the combination of a pair of similar rails each having a flat tread portion on its outer side, and an upstanding hollow bead upon its inner side, transverse corrugations upon the tread portion and means for securing the said rails to the cross ties of the track, said means including recesses upon the outer edge of the tread portion adapted to receive holding spikes and an outstanding flange upon the inner side of the bead, the said tread portions having longitudinal cores upon their under sides, means for holding the rails in alinement with respect to each other and for stiffening the track, including a splice bar tightly fitted within the hollow bead of each rail and projecting into and similarly fitting the beads of adjacent rails.

2. In a track for motor driven vehicles using unflanged wheels, the combination of a pair of similar rails each having a flat roughened tread portion upon its outer side and an upstanding hollow bead upon its inner side, of means for holding said rails in alinement and for stiffening the track, the said means including a splice bar adapted to closely fit into the bead near each end of each rail, and to project beyond the said ends and similarly fit into the beads of adjacent rails.

3. In a track for motor driven vehicles using unflanged wheels, the combination of a pair of similar rails each having a flat roughened tread portion upon its outer side and an upstanding hollow bead upon its inner side, rail bonding and track stiffening means comprising a splice bar tightly fitting into the bead at each end of each rail and projecting beyond the said ends and similarly fitting the beads of adjacent rails, the said splice bar being of such length as to allow it to rest upon a plurality of the cross ties of the track.

4. In a track for motor driven vehicles using unflanged wheels, the combination of a pair of similar rails each having a flat roughened tread portion upon its outer side and an upstanding hollow bead upon its inner side, of a separate splice bar tightly fitting into the hollow bead of each rail near both of its ends and which projects into and closely fits the beads of adjacent rails, the said splice bar being of sufficient length to be supported by a plurality of the cross ties of the track, whereby the rails are bonded and the track stiffened.

JAMES ARTHUR HALL.

Witnesses:
ELLA KELLY,
FRANK H. FOWLER.